United States Patent
Kammerer et al.

(10) Patent No.: US 9,630,700 B2
(45) Date of Patent: Apr. 25, 2017

(54) DEVICE FOR OPENING AN AIRCRAFT DOOR

(71) Applicant: FACC AG, Ried im Innkreis (AT)

(72) Inventors: Bernhard Kammerer, Zell/Pram (AT); Jakob Schoerkhuber, Geboltskirchen (AT); Thomas Burgholzer, Schaerding (AT)

(73) Assignee: FACC AG, Ried im Innkreis (AT)

( * ) Notice: Subject to any disclaimer, the term of this patent is extended or adjusted under 35 U.S.C. 154(b) by 0 days.

(21) Appl. No.: 15/112,997

(22) PCT Filed: Jan. 20, 2015

(86) PCT No.: PCT/AT2015/050017
§ 371 (c)(1),
(2) Date: Jul. 20, 2016

(87) PCT Pub. No.: WO2015/109352
PCT Pub. Date: Jul. 30, 2015

(65) Prior Publication Data
US 2016/0332716 A1    Nov. 17, 2016

(30) Foreign Application Priority Data
Jan. 21, 2014   (AT) .............................. A 50035/2014

(51) Int. Cl.
*B64C 1/14* (2006.01)
*B64C 1/06* (2006.01)

(52) U.S. Cl.
CPC .............. *B64C 1/143* (2013.01); *B64C 1/066* (2013.01); *B64C 1/1407* (2013.01); *B64C 1/1461* (2013.01)

(58) Field of Classification Search
CPC ..... B64C 1/143; B64C 1/1461; B64C 1/1407; B64C 1/066
See application file for complete search history.

(56) References Cited

U.S. PATENT DOCUMENTS 2,997,751 A    8/1961  Mcpherren
3,004,303 A *  10/1961  Wilmer .................... B64C 1/14
                                                     244/129.5

(Continued)

FOREIGN PATENT DOCUMENTS

CN    101570248 A    11/2009
CN    201484657 U    5/2010

(Continued)

OTHER PUBLICATIONS

International Bureau of WIPO, International Preliminary Report on Patentability Issued in Application No. PCT/AT2015/050017, Aug. 4, 2016, WIPO, 8 pages.

(Continued)

*Primary Examiner* — Philip J Bonzell
*Assistant Examiner* — Michael Kreiner
(74) *Attorney, Agent, or Firm* — McCoy Russell LLP

(57) ABSTRACT

A device for opening an aircraft door, comprising: a support arm arranged between the aircraft fuselage and the aircraft door; an opening system for opening the aircraft door; a support arm cover covering the support arm in the closed position of the aircraft door, the support arm cover having a cover element, and a flap element which swivels between being flush with the cover element, and a state in which the flap element overlaps the cover element; and a guide system for guiding the flap element, wherein the guide system has at least one guide arm, one end of which is joined in an articulated manner to the support arm, and the other end of which is joined to at least one guide element, which guide element can be guided along a guide track on the inner side of the flap element, when the aircraft door is opened.

20 Claims, 9 Drawing Sheets

(56) References Cited

U.S. PATENT DOCUMENTS

| | | | | |
|---|---|---|---|---|
| 5,156,359 | A * | 10/1992 | Noble | B64C 1/1407 244/129.4 |
| 5,180,121 | A * | 1/1993 | Banks | B64C 1/1407 16/317 |
| 5,289,615 | A * | 3/1994 | Banks | B64C 1/1407 16/366 |
| 5,305,969 | A * | 4/1994 | Odell | B64C 1/1407 244/129.5 |
| 5,667,169 | A * | 9/1997 | Erben | B64C 1/143 244/129.4 |
| 5,687,452 | A * | 11/1997 | Hamatani | B64C 1/1407 137/493 |
| 6,547,186 | B2 * | 4/2003 | Senger | B64C 1/143 244/129.5 |
| 6,655,634 | B2 * | 12/2003 | Erben | B64C 1/1407 16/366 |
| 6,685,139 | B2 * | 2/2004 | Blum | B64C 1/1407 244/129.5 |
| 6,729,581 | B2 * | 5/2004 | Buchs | B64C 1/1407 244/119 |
| 6,834,834 | B2 * | 12/2004 | Dazet | B64C 1/1407 16/368 |
| 7,357,354 | B2 * | 4/2008 | Mortland | B64C 1/1407 244/129.4 |
| 7,578,476 | B2 * | 8/2009 | Wiers | B64C 1/143 244/129.5 |
| 7,735,199 | B2 * | 6/2010 | Clausen | B64C 1/1407 16/354 |
| 8,511,610 | B2 * | 8/2013 | Depeige | B64C 1/14 244/129.4 |
| 8,881,524 | B2 * | 11/2014 | Andres | B64C 1/1407 60/632 |
| 8,919,699 | B2 * | 12/2014 | Kress | B64C 1/1423 244/129.4 |
| 9,132,905 | B2 | 9/2015 | Ruppin | |
| 9,199,716 | B2 * | 12/2015 | Knijnenburg | B64C 1/1407 |
| 2006/0202087 | A1 | 9/2006 | Mortland | |
| 2016/0083071 | A1 * | 3/2016 | Pichlmaier | B64C 1/1423 92/76 |

FOREIGN PATENT DOCUMENTS

| | | |
|---|---|---|
| DE | 2907550 A1 | 9/1980 |
| DE | 102011109652 A1 | 2/2013 |
| EP | 0317037 A2 | 5/1989 |
| EP | 0465785 A1 | 1/1992 |
| GB | 868390 | 5/1961 |
| GB | 1228969 | 4/1971 |

OTHER PUBLICATIONS

ISA European Patent Office, International Search Report Issued in Application No. PCT/AT2015/050017, Apr. 21, 2015, WIPO, 6 pages.

* cited by examiner

DEVICE FOR OPENING AN AIRCRAFT DOOR

CROSS REFERENCE TO RELATED APPLICATIONS

The present application is a U.S. National Phase of International Patent Application Serial No. PCT/AT2015/050017, entitled "DEVICE FOR OPENING AN AIRCRAFT DOOR," filed on Jan. 20, 2015, which claims priority to Austrian Patent Application No. A50035/2014, entitled "DEVICE FOR OPENING AN AIRCRAFT DOOR," filed on Jan. 21, 2014, the entire contents of each of which are hereby incorporated by reference for all purposes.

TECHNICAL FIELD

The invention relates to a device for opening an aircraft door provided on an aircraft fuselage, said device comprising: a support arm that can be arranged in an articulated manner between the aircraft fuselage and the aircraft door; an opening system for opening the aircraft door by lifting the aircraft door from a closed position into an intermediate position and transferring the aircraft door from the intermediate position into an open position; a support arm cover substantially entirely covering the support arm in the closed position of the aircraft door, wherein the support arm cover has a cover element immovably arranged on the support arm, and a flap element which, when the aircraft door is opened, can swivel between a state in which said flap element is substantially flush with the cover element, and a state in which said flap element overlaps the cover element; and a guide system for guiding the flap element when the aircraft door is opened.

BACKGROUND AND SUMMARY

Such devices are known from the prior art. For opening the aircraft door, the aircraft door is initially lifted slightly from the sealed closed position and then shifted or swivelled into the open position. From DE 10 2011 109 652 A1, for example, such a device is known, in which the aircraft door is pivotally supported on the aircraft fuselage by means of a support arm. The visible side of the support arm is faced with a cover.

For reasons of safety and for aesthetic aspects, it is necessary that the inner side of the aircraft door, which faces the seating compartment, is essentially completely covered by a cover. For this purpose, a support arm cover is provided, which comprises a flap element for the release of the swivel movement of the support arm, which element can swivel relative to a stationary cover element, when the door is opened. Thus, the cover element can slide beneath the flap element.

Up to now, two different concepts of triggering the flap elements have been used in the prior art, which for various reasons are disadvantageous, however.

On the one hand, the flap element was guided by means of a roll, subject to spring preload, on the visible side of the cover of the support arm. As a disadvantage, the rolling results in traces of wear on the visible side of the cover, an effect that should be avoided. It is true that guide strips made of metal could also be mounted on the external side of the cover. However, this interferes with the homogeneous appearance of the cover in a disadvantageous manner.

On the other hand, it is known from the prior art to kinematically trigger the flap element via a mechanical connection in the form of a connecting rod. Due to the limited space available in the assembly situation, it constitutes a disadvantage that the flap element can be joined in an articulated manner on the aircraft door only very closely to the pivot point of the flap element. However, it has turned out that such a design reacts too sensitively and is prone to malfunction. What is more, the constructional effort is disadvantageous.

In addition, various devices for opening aircraft doors are known from the prior art, in which, however, the problem of swivelling and guiding the flap element of the inner lining of door is not dealt with.

EP 0 317 037 A2 discloses a different hinge mechanism for an aircraft door, by which the aircraft door is pivotally connected to the fuselage. For this purpose, guide elements of the link-guide type are provided. However, this prior art cannot contribute anything to reliably guiding the flap element of the door cover across the visible side of the lining, when the doors opens. For this, the link guide from the prior art would be unsuitable for lack of space alone.

GB 1,228,969 A describes an aircraft door supported on the fuselage of an aircraft, which can be opened by means of a swivel mechanism. For increasing the door opening, the aircraft door can be pushed along the external side of the fuselage by means of rolls arranged in an upper and a lower guide track.

US 2006/202087 A1 discloses a hinge assembly for pivotally attaching an aircraft door to an aircraft fuselage. The hinge assembly comprises a curved pivot element, one end of which is pivotally attached to a link element, and the other end of which is pivotally attached to link elements. In any case, said prior art cannot contribute either to the solution to the problem posed to the present invention.

DE 29 07 550 A1 relates to a different folding insert door for aircrafts for opening or closing an opening in the fuselage, the opening being smaller than the door.

Finally, CN 101570248 A discloses a different lifting mechanism for aircraft doors and CN 201484657 U discloses a different swivelling mechanism for aircraft doors.

Compared to this, the object of the present invention is to reduce or eliminate the disadvantages of the prior art. In particular, the aim of the invention is to provide a constructionally simple device of the above given type, by means of which the limited spatial conditions are taken into consideration, when the aircraft door opens, and by means of which the visible side of the support arm cover can be treated with care when in use.

This object is achieved by a device for opening an aircraft door provided on an aircraft fuselage, said device comprising: a support arm that is arranged in an articulated manner between the aircraft fuselage and the aircraft door; an opening system for opening the aircraft door by lifting the aircraft door from a closed position into an intermediate position and transferring the aircraft door from the intermediate position into an open position; a support arm cover substantially entirely covering the support arm in the closed position of the aircraft door, wherein the support arm cover has a cover element immovably arranged on the support arm, and a flap element which, when the aircraft door is opened, swivels between a state in which the flap element is substantially flush with the cover element, and a state in which the flap element overlaps the cover element; and a guide system for guiding the flap element when the aircraft door is opened, wherein the guide system has at least one guide arm, one end of which is joined in an articulated manner to the support arm, and the other end of which is joined to at least one guide element, wherein the guide element is guided along a guide track on an inner side of the flap element, when the aircraft door is opened.

In accordance with the invention the guide system comprises at least one guide arm, one end of which is joined in an articulated manner to the support arm, and the other end of which is joined to at least one guide element, which can be guided along a guide track on the inner side of the flap element, when the aircraft door is opened.

In the closed position of the aircraft door, the immovably arranged cover element and the pivotable flap element are substantially flush with each other, that is to say are arranged side-by-side in the same plane, wherein essentially no gap is formed between the adjacent portions of the cover element and the flap element. Thus, the visible side of the support arm facing the interior of the aircraft, which support arm, for one thing, is joined to the aircraft fuselage and, for the other thing, is joined to the aircraft door in an articulated manner, is covered essentially completely by the support arm cover consisting at least of the cover element of the flap element, when it is in the closed position. On the side of the interior of the aircraft, the aircraft door is likewise provided with cover elements. To initiate the opening process, usually an operating lever on the inner side of the aircraft door is tripped. Thus, the aircraft door is lifted from a closing position sealing the aircraft fuselage upwards essentially in vertical direction and into an intermediate position. Subsequently, the aircraft door can be pushed or swivelled outwards into the open position, thus releasing an entrance opening into the aircraft. The aircraft door is preferably supported on the support arm in such a manner that the aircraft door is initially pushed outwards and then guided into the open position in a manner essentially parallel to the aircraft fuselage. This opening mechanism is known as such in the prior art. Upon swivelling the support arm, the flap element, which is preferably supported on the aircraft door about an especially essentially vertical swivel axis, will be pushed across the visible side of the cover element at a distance thereto. Swivelling of the support arm can be released thereby. The guide element of the guide system is guided on the inner side of the flap element, that is to say on the side of the flap element facing away from the visible side. Thereby, the flap element is kept at a distance to the visible side of the cover element, when the support arm is swivelled. For this purpose, the guide element is arranged on the end of a guide arm, which is supported in an articulated manner to the support arm directly or indirectly via a mounting element. Upon opening the aircraft door, the guide arm is swivelled upwards, thus increasing the normal distance, that is the horizontal distance between the articulated connection of the guide arm on the side of the support arm and the guide element on the side of the flap element. Accordingly, by swivelling the guide arm, the guide system is moved from a compressed state in the closed position of the aircraft door into an extended state of the guide system in the open position of the aircraft door. This reliably ensures that the flap element can be guided to the overlapping position with the cover element during swivelling the guide arm. In the overlapping position, the flap element is partially arranged above the cover element. Since the guide system according to the invention does not come into contact with the visible side of the cover element, advantageously the visible side of the cover element can be protected from signs of wear. Moreover, the guide system according to the invention distinguishes itself by low space requirement. In addition, it is an advantage that the guide element can engage closely on the pivotable edge portion of the flap elements, thus allowing a particularly reliable, precise guiding of the flap element, when the aircraft door opens. Compared to this, disadvantageously the connecting rod provided in the prior art could be supported only very closely on the center of rotation of the flap element. Moreover, the guide system according to the invention has the advantage that the force for pressing the sealings in the closed position of the aircraft door can be initiated especially efficiently.

To ensure that the flap element is guided reliably and at low costs of construction, it is favorable that the guide element comprises at least a roll element that can roll on the guide track on the inner side of the flap element. Upon opening the aircraft door, a force is exerted on the flap element via the roll element on the end of the guide element, which force causes the flap element to swivel outwards, away from the immovable cover element. Upon opening the aircraft door, the guide arm between the roll element and the support arm is swivelled in such a way that the normal distance, that is the distance in horizontal direction between the joint of the guide arm on the side of the support arm and the roll element on the side of the guide track increases. In this manner, it is possible to reliably prevent that the flap element impinges upon the cover element, when the aircraft door is swivelled. A particularly precise guiding of the flap element can be ensured if the guide track on the inner side of the flap element reaches up to an edge portion adjacent to the cover element. When the support arm is swivelled, the guide element, starting from the edge portion of the flap element, is guided towards the pivot axis of the flap element.

For force transmission between the guide element and the flap element, it is advantageous that the guide element comprises a roll element rotatable about an essentially vertical rotational axis, which roll element can roll on an essentially vertical guide surface of the guide track.

For the purpose of this disclosure, "vertical" refers to the direction of lifting the aircraft door prior to swivelling, that is to say in the mounted state, the direction perpendicular to the floor surface of the aircraft. The terms "top" and "bottom" also refer thereto. Accordingly, "horizontal" means the plane perpendicular to the lifting movement of the aircraft door.

In accordance with a particularly preferred embodiment, the guide element comprises a roll element rotatable about an essentially horizontal rotational axis and which can roll on a corresponding, in particular essentially horizontal guide projection of the guide track. In this embodiment, the vertical position of the guide element can be defined by means of the guide projection of the guide track. Preferably, the horizontally rotating roll element rolls on the upper side of the horizontal guide projection. Said embodiment has the advantage of that the guide element is carried along upwards by the guide projection on the flap element, when the aircraft door is lifted, whereby the guide arm is swivelled upwards and the flap element is pressed outwards.

To achieve better guiding of the roll element, it is advantageous when the diameter of the horizontally rotating roll element increases towards its free end. The height of the guide projection preferably increases outwardly in accordance with the horizontally rotating roll element, away from the inner side of the flap element. Accordingly, an undercut is formed on the horizontally rotating roll element, by means of which a reliable contact is achieved with the correspondingly formed guide surface of the guide projection on the inner side of the flap element.

Moreover, it is favorable when the guide projection for the horizontally rotating roll element comprises a height variation. In this embodiment, the guide surface of the guide projection comprises a section having a course that is variable in vertical direction, in particular a course that increases. Advantageously, the normal distance between the guide element on the inner side of the flap element and the support of the guide arm on the support arm can accurately be adjusted to obtain the desired swivel movement of the flap element.

Preferably, a support element forming the guide track for the guide element is mounted on the inner side of the flap element. Principally, it would also be conceivable to design the guide track directly on the inner side of the flap element.

To guide the flap element over the immovable cover element, upon opening of the aircraft door, it is favorable that the at least one guide arm is connected to a spring element, so that the at least one guide arm can be transferred, with the help of the spring element, from a compressed state of the guide system in the closed position of the aircraft door into an at least partially extended state of the guide system in the open position of the aircraft door. Therefore, the spring element presses the guide arm in the direction of the extended state of the guide system, in which the normal distance between the guide element and the articulated connection of the guide arm with the support arm is larger than in the compressed state of the guide system. For this purpose, in the compressed state of the guide system, the guide arm is arranged at a steeper angle relative to the horizontal line than in the extended state of the guide system.

For preloading the guide arm in the direction of the extended state of the guide system it is advantageous to provide a torsion spring as a spring element, which is preferably arranged about the hinge of the guide arm on the side of the support arm. This embodiment has a simple and long-lasting construction.

According to a particularly preferred embodiment, the guide system comprises two guide arms arranged in particular essentially parallel to one another, the one ends of which are joined in an articulated manner to the support arm, and the other ends of which are joined in an articulated manner to a connecting element between the guide arms. Preferably, exactly two guide arms are provided, so that a four-bar linkage is created. The guide element is preferably supported on the connecting element between the guide arms. Advantageously, the guide element can be guided along the guide track in an unchanging angular position, in particular in the vertical position, when the guide arms are swivelled upon opening the door.

To obtain a design which is resilient and has a simple construction, preferably the connecting element has an elongate connecting arm, the ends of which are connected to the guide arms in an articulated manner.

In this embodiment it is preferably provided that the connecting arm comprises accommodating points spaced in a longitudinal direction for accommodating a shaft element supporting the vertically rotating roll element.

In addition, it is favorable when the connecting arm comprises a bore for accommodating an axle element supporting the horizontally rotating roll element.

For attaching the guide system to the support arm it is advantageous to define the hinge between the guide arm and the support arm on a mounting element, which is preferably mounted on a front side of the support arm, which front side faces the flap element. Thus, the mounting element is preferably located behind the support arm cover, that is to say on the side of the support arm cover facing away from the visible side, so that the guide system is not visible in operation.

When the guide system comprises a link element on the support arm, in which link element a guide member can be guided on the inner side of the flap element, when the aircraft door is lifted, guiding of the flap element can advantageously be supported at the beginning of the opening process or at the end of the closing process. Guiding of the flap element by means of the link element or the guide member is preferably effective only during lifting of the aircraft door at the beginning of the opening process and during lowering of the aircraft door at the end of the opening process, whereby in-between guiding of the flap element is managed with the guide element guided on the guide track of the flap element.

For transferring the vertical movement of the aircraft door onto the flap element, it is particularly advantageous when the link element comprises a guide channel that extends transversely to the vertical line and is open on one side, so that shifting of the guide member along the guide channel of the link element is converted into a swivelling of the flap element, when the aircraft door is lifted. By lifting the aircraft door the flap element shifts upwards relative to the cover element. Due to the link guide the flap element is swivelled outwards at the same time, and a gap is formed between the cover element and the flap element. Starting from this position, the aircraft door can be opened by swivelling the support arm, the flap element gliding past the visible side of the cover element. The guide system prevents the flap element from damaging the visible side of the cover element.

To ensure permanent function of the link guide, it is favorable if the guide member comprises a guide roll that can roll on a wall of the link element.

To ensure a flush arrangement between the cover element and the flap element upon reaching the closed position of the aircraft door, it is favorable if at least two link elements for at least two guide members on the inner side of the flap elements are provided on the support arm, preferably one guide member being arranged on each the upper end portion and the lower end portion of the flap element.

BRIEF DESCRIPTION OF THE FIGURES

Below, the invention will be further illustrated on the basis of the preferred embodiments shown in the drawing, to which it is not to be limited. In detail, the drawing shows the following.

DETAILED DESCRIPTION

Figure 1:
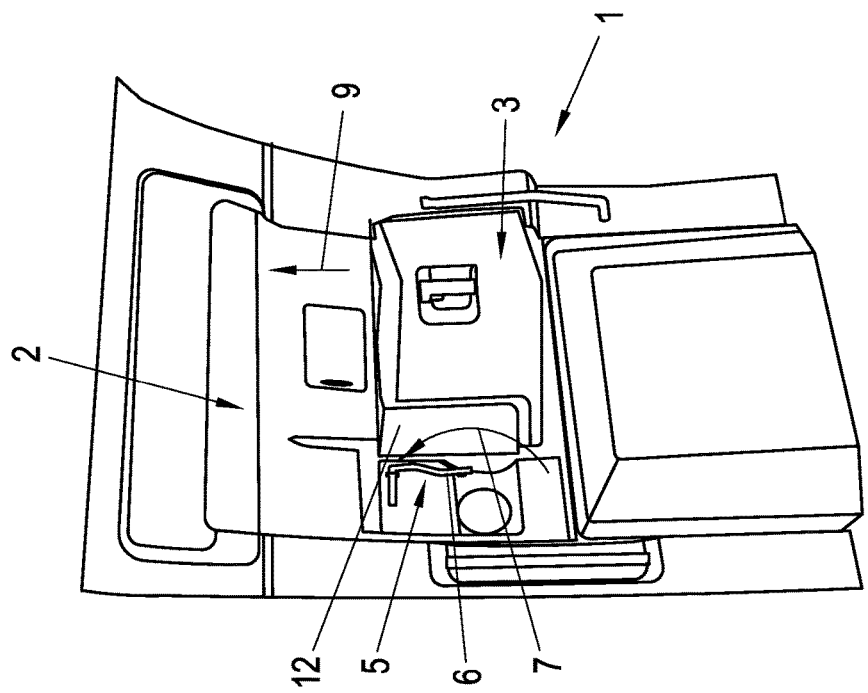
FIG. 1 schematically a device according to the invention for opening an aircraft door shown in a closed position, which is supported in an articulated manner on a support arm, the visible side of which is formed by a support arm cover comprising an immovable cover element and a pivotable flap element.
Figure 2:
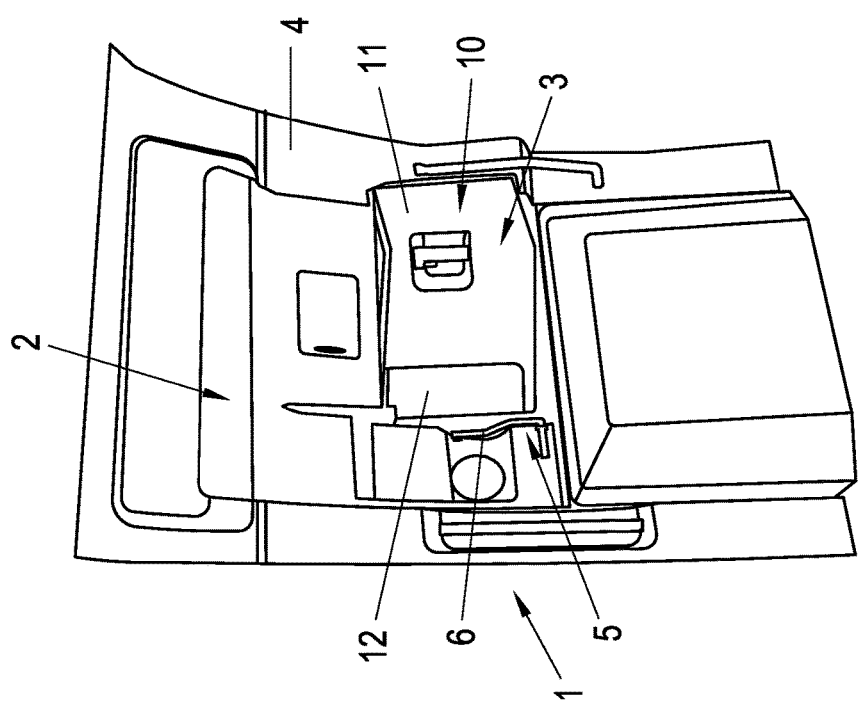
FIG. 2 the device according to FIG. 1 in an intermediate position of the aircraft door, which is obtained by lifting the aircraft door from the closed position according to FIG. 1.

FIGS. 1 to 4 show a device 1 for opening an aircraft door 2 at different stages of the opening process. The aircraft door 2 is connected in an articulated manner to a support arm 3, which is supported in an aircraft fuselage 4 in a manner pivotable about a vertical pivot axis 3' (cf. FIG. 4). For opening the aircraft door 2, an opening system 5, which is known as such in the prior art, is provided, which comprises an actuating lever 6. By actuating the actuating lever 6 in the direction of the arrow 7, the aircraft door 2 is shifted from a closed position (FIG. 1), in which an entry opening 8 (cf. FIGS. 3, 4) is closed, in a vertical direction 9 upwards and into an intermediate position (FIG. 2). Thereupon, the aircraft door 2 can be moved outwards in the direction of arrow 2' and into an open position (FIGS. 3, 4) to release the entry opening 8.

Figure 3:
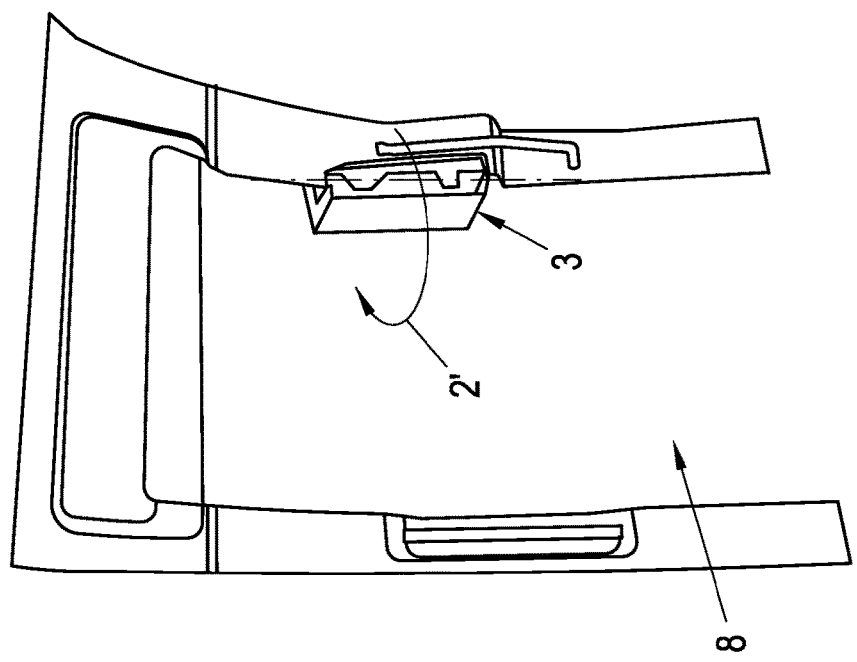
FIG. 3 the device according to FIGS. 1, 2 in an open position of the aircraft door, which is moved outwards.

Furthermore, as can be seen from FIGS. 1 to 3, the support arm 3 is connected to a support arm cover 10 on the side facing the interior of the aircraft, which cover essentially completely covers the support arm 3 in the closed position of the aircraft and thus forms the visible side of the support arm 3. The support arm cover 10 comprises a cover element 11 arranged immovably on the support arm 3 and a flap element 12, which is pivotable on the aircraft door 2 about a vertical pivot axis 12' (cf. FIGS. 8 to 11). Upon opening of the aircraft door, the flap element 12 is swivelled to outside to create a condition that is essentially flush with the cover element 11 or is arranged next one another in an essentially gap-free manner in the closing position of the aircraft door 2 (cf. FIG. 1), away from the cover element 11. Subsequently, the flap element 12 can slide into a state overlapping with the cover element 11 upon swivelling the support arm 3 above the visible side of the cover element 11.

Figure 5:
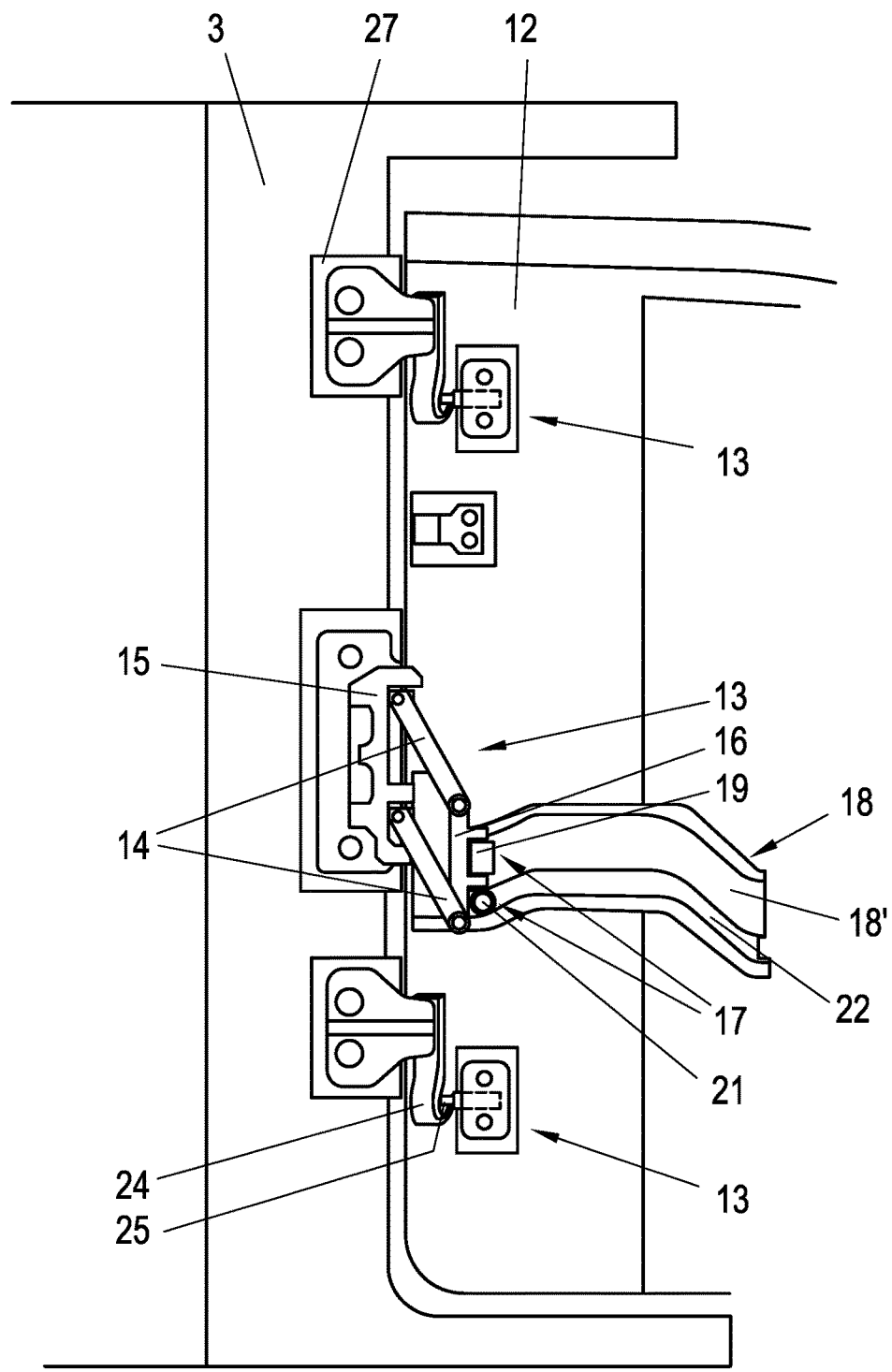
FIG. 5 is a view of the inner side of the flap element or of support arm at the beginning of the opening process, wherein the flap element is swivelled from the flush arrangement with the cover element to the outside by means of a guide system.
Figure 6:
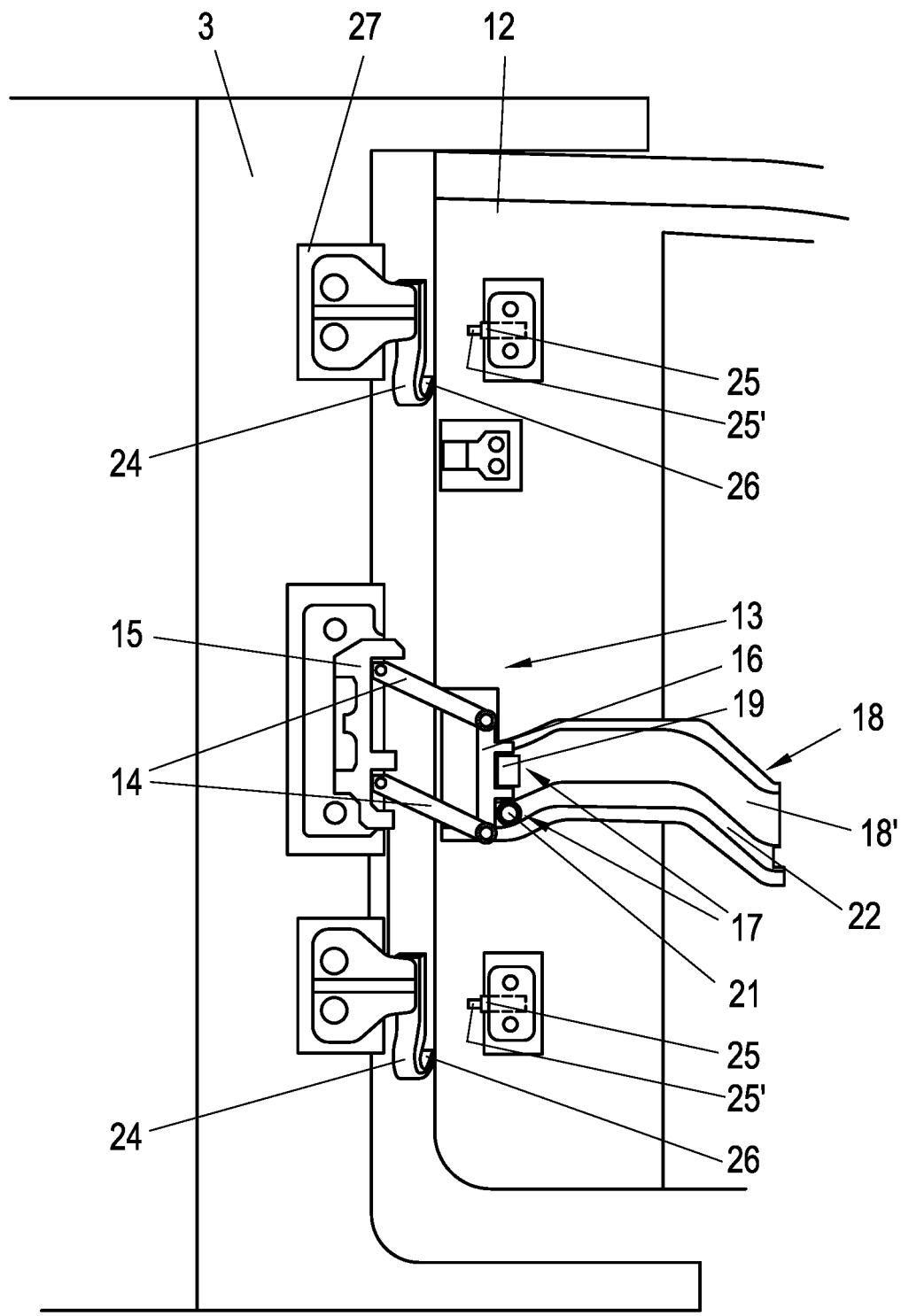
FIG. 6 a view according to FIG. 5, wherein the aircraft door has reached the intermediate position.
Figure 7:
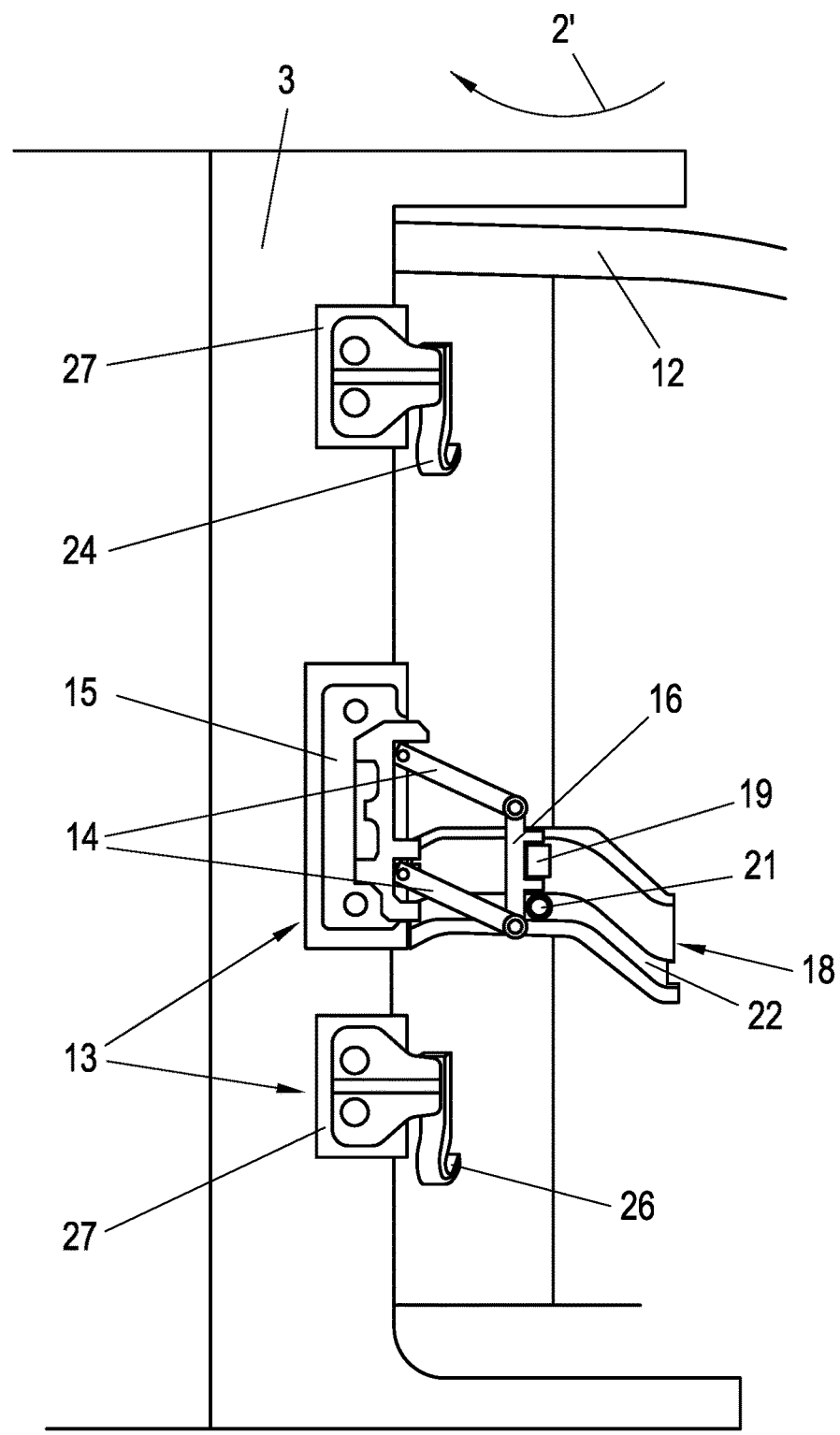
FIG. 7 a view according to FIGS. 5, 6 during the swivelling of the support arm, wherein the roll element is guided at the end of the guide arm along a guide track on the inner side of the flap element.

As can further be seen from FIGS. 5 to 7, a guide system 13 is provided for guiding the flap element 12, when the aircraft door is opened. In the shown embodiment, the guide system 13 comprises two guide arms 14, the one ends of which are supported in an articulated manner to the support arm 3 via a mounting element 15. The mounting element 15 is mounted on a front side 3' of the support arm 3, which front side faces the flap element 12 (cf. FIGS. 8 to 11). On the opposite sides, the guide arms 15 are connected to a guide element 17 via a connecting element 16. Upon opening the aircraft door 2, the guide element 17 can be guided along a guide track 18 on the inner side of the flap element 12. For designing the guide track 18 for the guide element 17, a bearing element 18' is mounted on the inner side of the flap element 12, extending inwardly from the pivotable edge portion of the flap element 12.

As can be seen from FIGS. 5 to 7, the guide element 17 comprises a roll element 19 rotatable about an essentially vertical rotational axis, which can roll on an essentially vertical guide surface of the guide track 18. Moreover, the guide element 17 comprises a roll element 21 rotatable about an essentially horizontal rotational axis, which can roll on an essentially horizontal guide surface on the upper side of a guide projection 22 of the guide track 18.

As can further be seen from FIGS. 5 to 7, the guide projection 22 for the horizontally rotating roll element 21 comprises a height variation, that is a course increasing or decreasing in vertical direction. Thereby, the pivot angle of the guide arms 14 and thus the normal distance between the articulated connections on the opposite sides of the guide arms 14 can be adjusted.

The guide arms 14 of the guide system 13 are connected to spring elements 23 (cf. FIGS. 12 to 14) which exert a torque on the guide arms 14 such that the guide arms 14 are preloaded toward the upwardly swivelled position. Upon opening the aircraft door 2, the guide system 13 is transferred from a compressed state, in which the guide arms 14 are arranged at a first, steeper angle to the horizontal line, into an extended state, in which the guide arms 14 are arranged at a second, flatter angle to the horizontal line.

Further, as can be seen from FIGS. 5 to 7, the guide system 13 additionally comprises two link elements 24 on the support arm, in which guide members 25 can be guided on the inner side of the flap element 12. On the one hand, this link guide is effective at the beginning of the opening process (cf. FIG. 5), to swivel the flap element 12 outwardly. On the other hand, the link guide is designed to precisely place the flap element 12 in the position that is aligned flush with the cover element 11 at the end of the closing process.

Further, as can be seen from FIGS. 5 to 7, the guide elements 24 each comprise a guide channel 26 which is open on one side and extends at an inclination angle to the vertical line. Upon lifting the aircraft door 2, the flap element 12 is swivelled by shifting the guide members 25 along the guide channels 26 of the link elements 24. Vice versa, the link guide causes that the flap element 12 is arranged precisely in the position terminating flush with the cover element 11, when the closing position of the aircraft door 2 is reached. In the shown embodiment, the guide members 25 are formed by guide rolls 25', which roll on the walls of the guide elements 24 limiting the guide channels 26. When the aircraft door 2 is shifted into the intermediate position, the guide members 25 slide out of the link elements 24. Subsequently, the guide element 17, together with the guide track 18, takes over the guiding of the flap element 12.

Further, as can be seen from FIGS. 5 to 7, two link elements 24 are provided on the support arm 3, that is each a link element 24 in the upper end portion and a link element 25 in the lower end portion of the flap element 12. In the shown embodiment, the link elements 24 are designed hook-shaped. Mounting plates 27 are provided for mounting the link elements 24 to the support arm 3 and are attached to the front side 3''' of the support arm 3.

Figure 4:
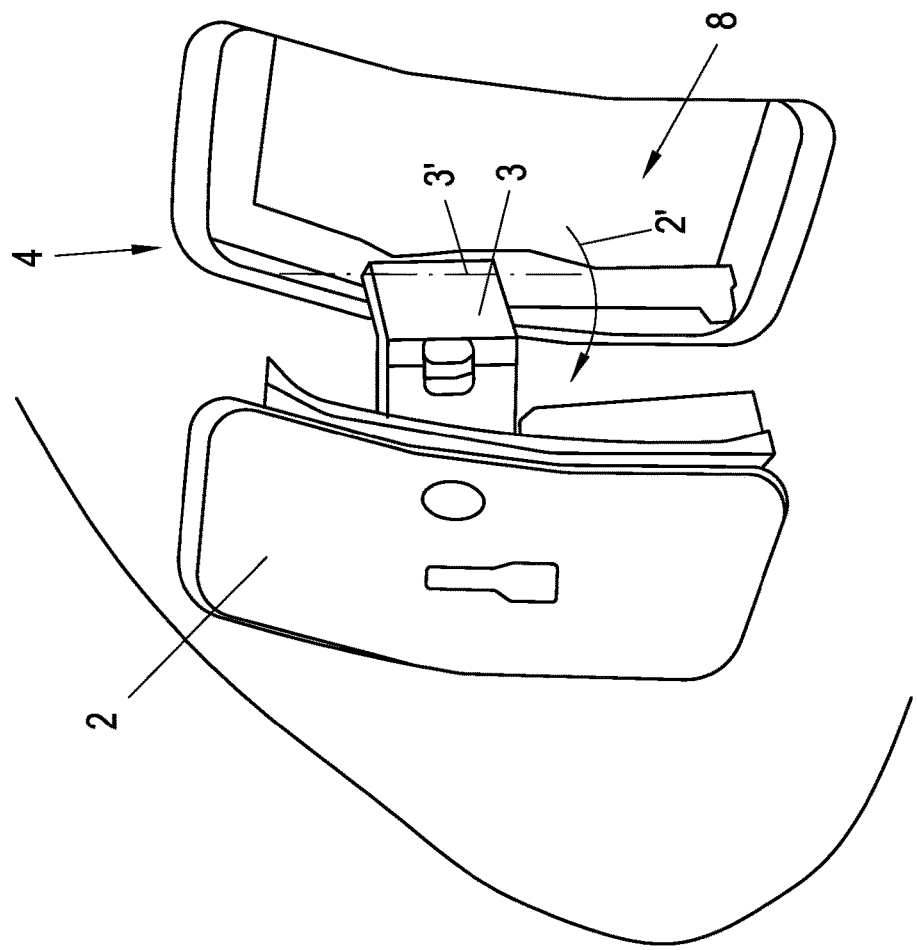
FIG. 4 the device according to FIGS. 1 to 3 in an exterior view of the aircraft.

FIGS. 8 to 11 show cross-sectional views of the device 1 in various stages of the opening process, wherein FIG. 1 corresponds to the closed position of the aircraft door 2, FIG. 2 corresponds to the lifted intermediate position (cf. the lifting movement which is schematically indicated by arrow 9), FIG. 3 corresponds to the position during the swiveling of the support arm 3 in the direction of arrow 2' and FIG. 4 corresponds to the open position of the aircraft door 2.

Figure 8:
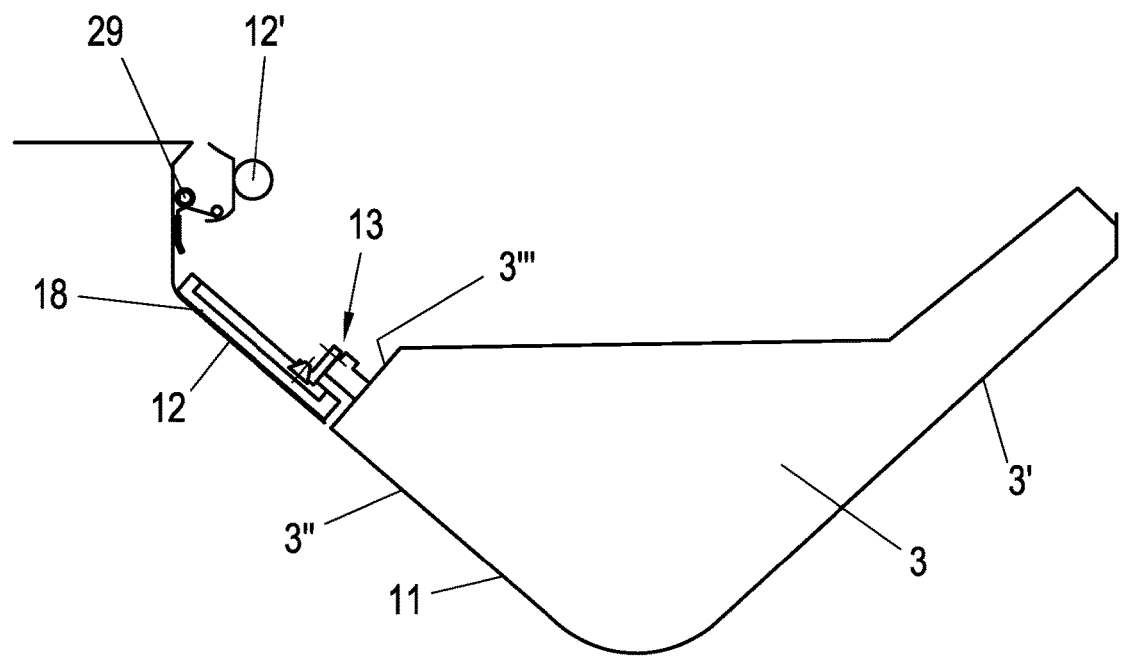
FIGS. 8, 9, 10, and 11 show cross-sectional views of the support arm or the support arm cover upon opening the aircraft door.

From FIG. 8, in particular, the flush arrangement of the cover element 11 and the flap element 12 in the closed position of the aircraft door 2 can be seen. Furthermore, it can be seen that the support arm 3 in cross-section comprises legs 3', 3'' arranged to one another at an angle, thus enabling the support arm 3 to be swivelled about the adjacent edge of the aircraft fuselage 3. The guide system 13 for guiding the flap element 12 is arranged between the front side 3''' of the support arm 3 facing the flap element 12 and the flap element 12. Thus, passengers cannot see the guide system 13, when the aircraft door is opened.

Figure 9:
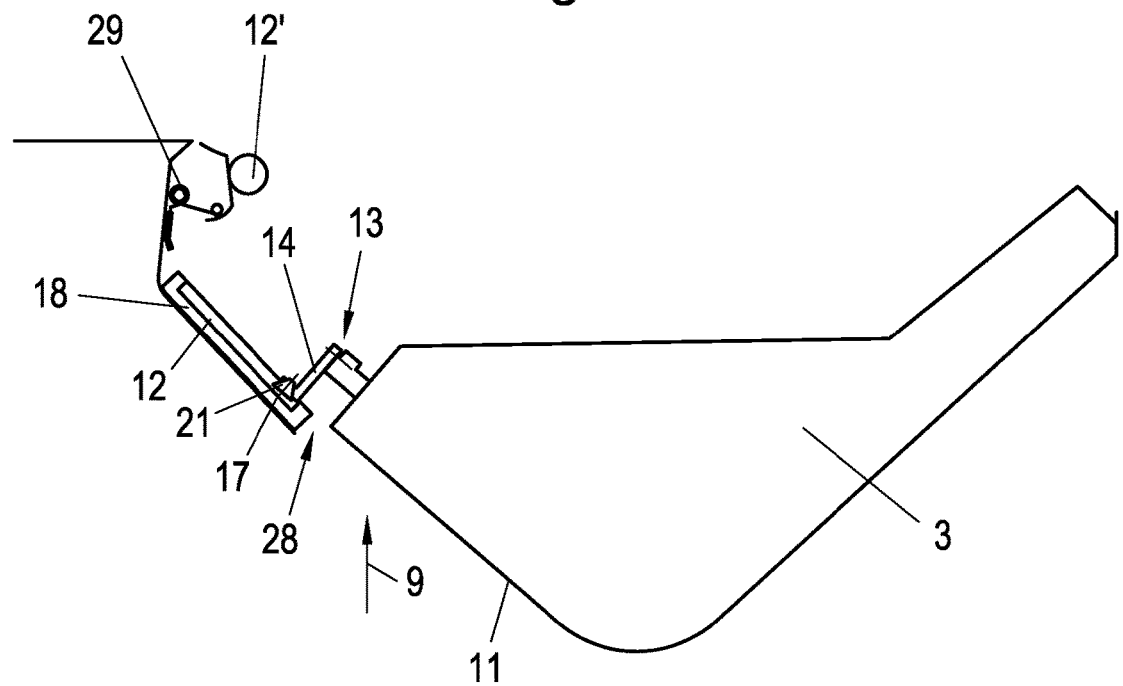

According to FIG. 9, the flap element 12 was swiveled outwardly upon lifting the aircraft door 2 into the intermediate position by means of the guide members 25 in the link elements 24, so that the gap 28 is formed between meeting edge portions of the flap element 12 or the cover element 11, respectively. The flap element 12 is biased by means of a spring element 29 toward the flush arrangement between the cover element 11 and the flap element 12 in the closing position of the aircraft door 2. Therefore, the guide system 13 is designed to overcome the spring effect of the spring element 29, when the aircraft door 2 is opened.

Figure 10:
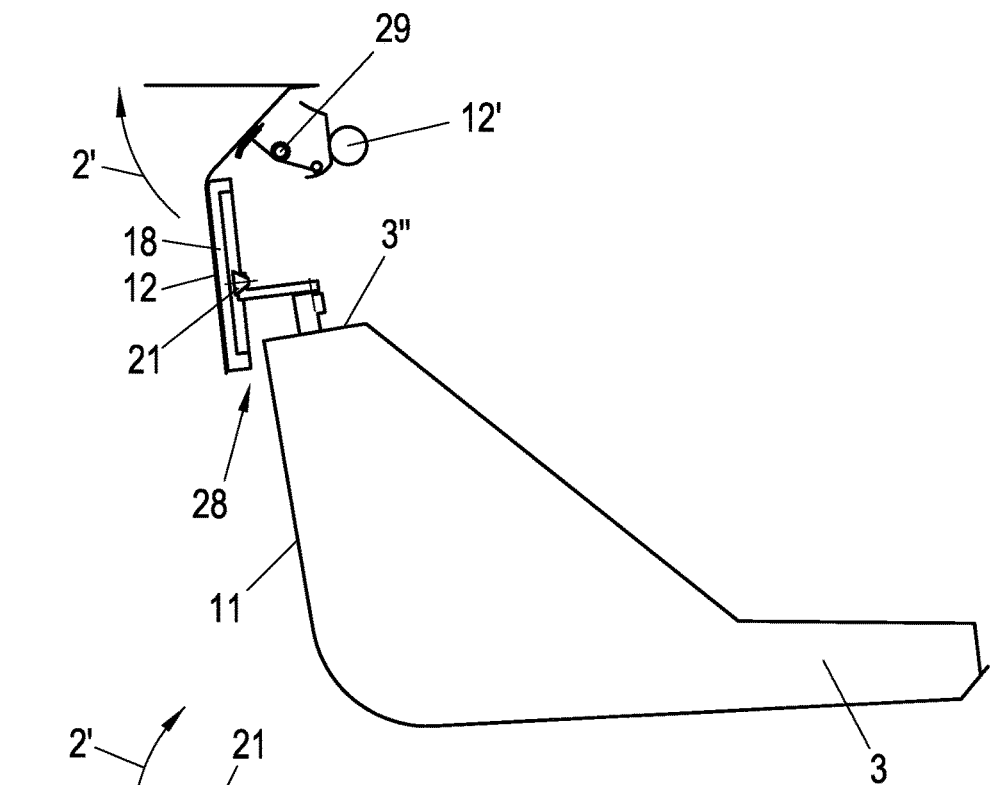

According to FIG. 10, the aircraft door 2 is swivelled toward the open position, as is schematically indicated by arrow 2'. The free end portion of the flap element 12 is pushed so as to lie above the cover element 11, at a distance thereto, by maintaining the gap 28. Thus, the guide arms 14 are swiveled upwardly with the help of the spring elements 23 or the guide projection 22, respectively. A force is exerted by the guide element 17 on the guide track 18 on the inner side of the flap element 12, which force keeps the flap element 12 at a distance to the cover element 11, when the aircraft door 2 is opened.

Figure 11:
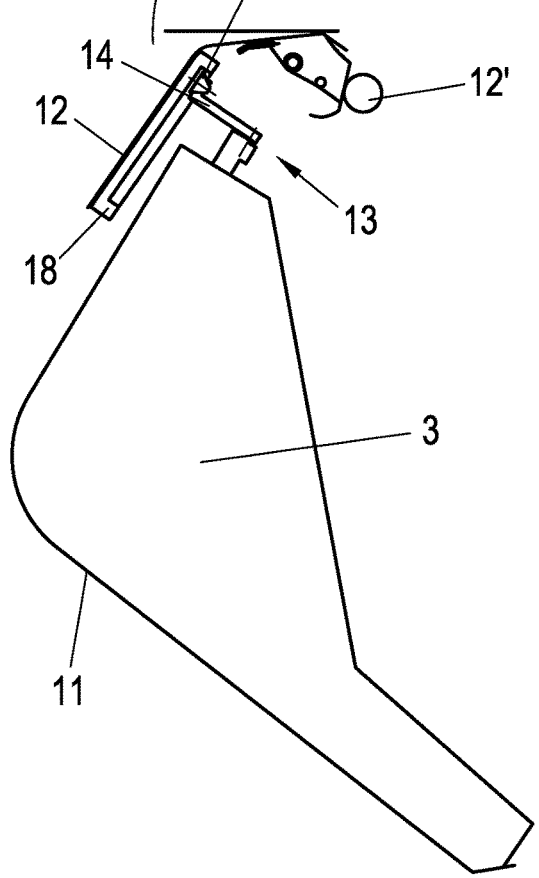

FIG. 11 shows the device 1 in the open position of the aircraft door 2, wherein the guide element 17 has been pushed up to the end of the guide track 18 on the inner side of the flap element 12.

Figure 13:
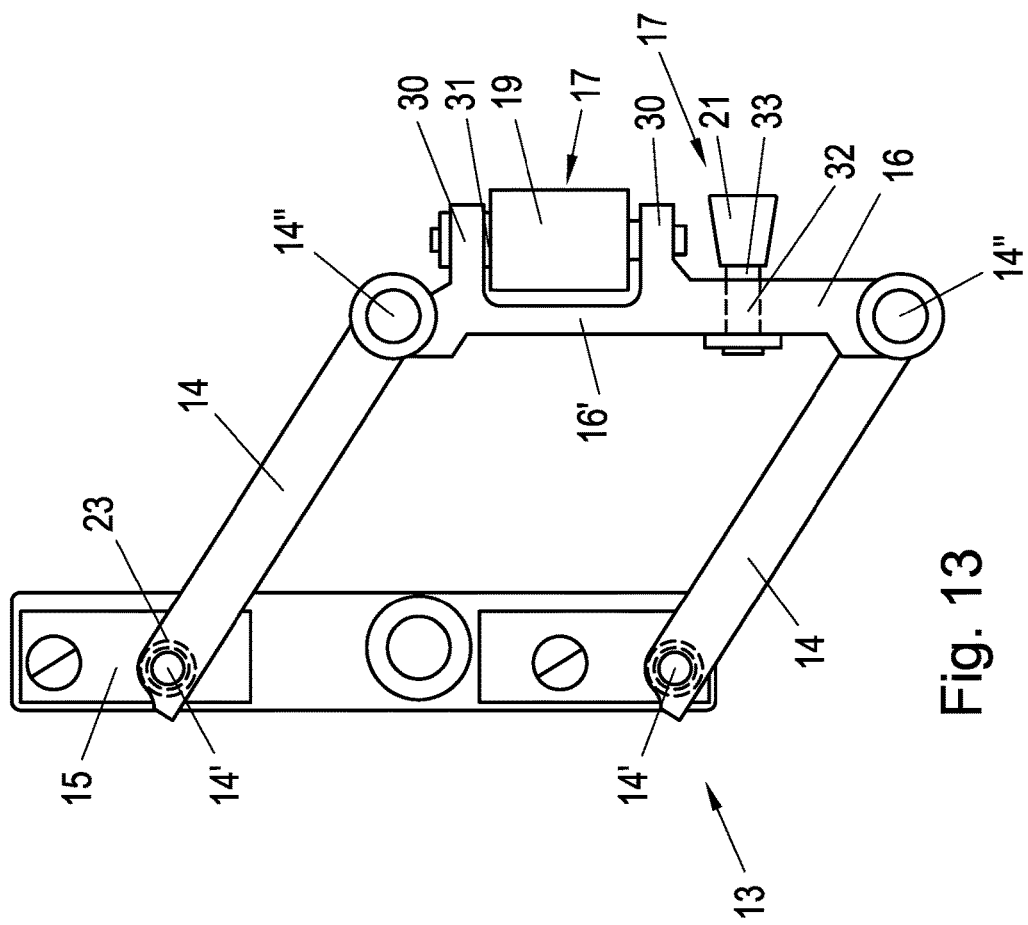
FIGS. 12, 13 and 14 show views of the guide system of FIGS. 4 to 10 for guiding the flap element upon opening the aircraft door.
Figure 12:
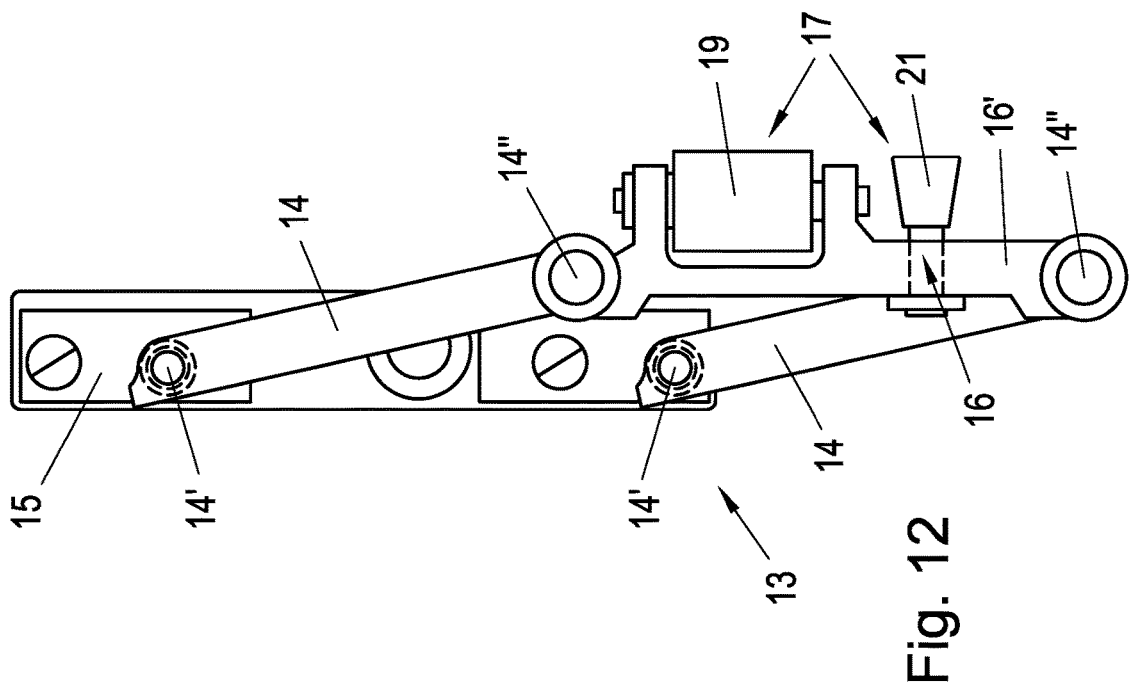
Figure 14:
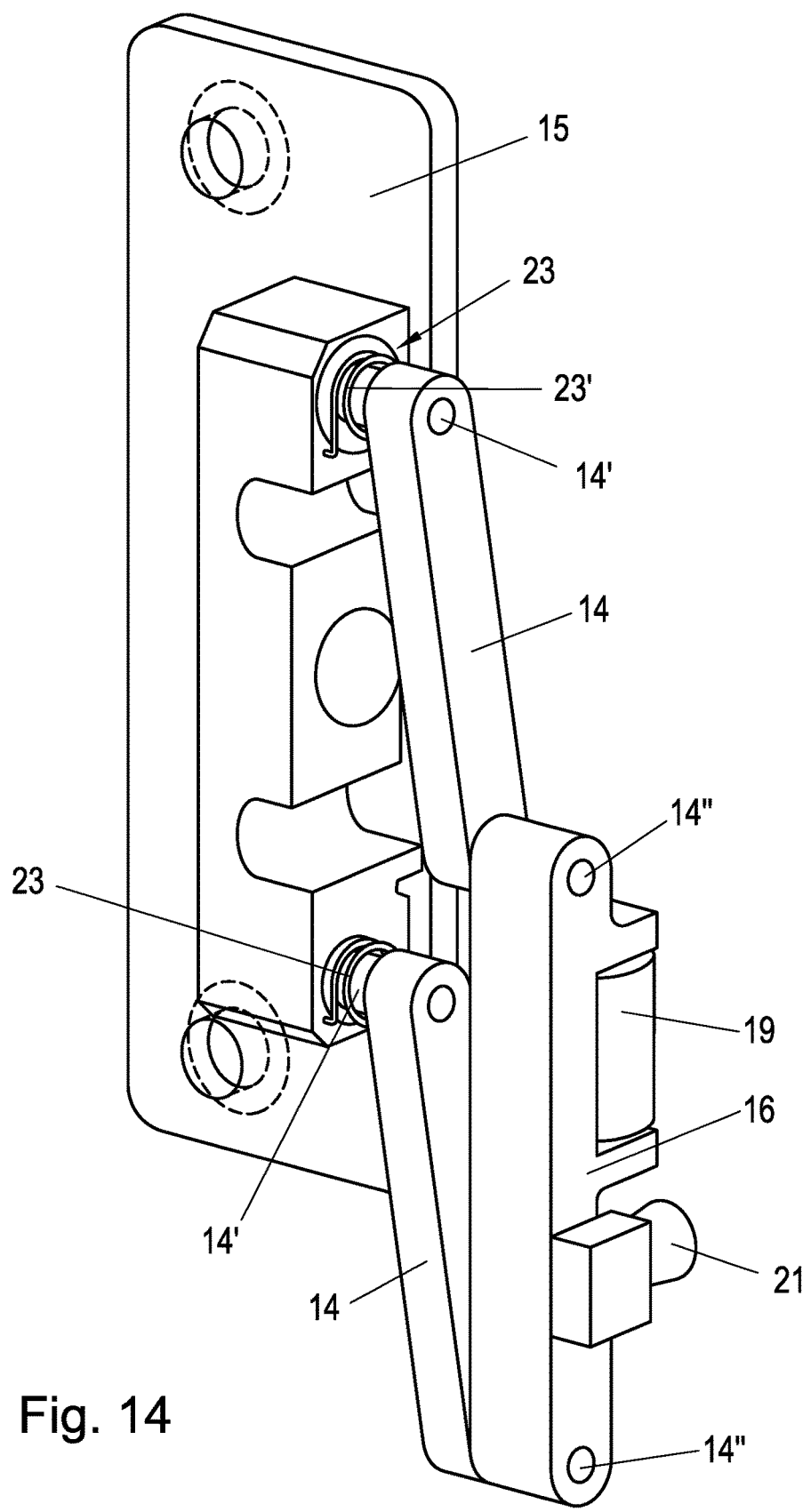

FIGS. 12 to 14 show detailed views of the guide system 13 for guiding the flap element upon opening of the aircraft door 2. In the shown embodiment, two identical guide arms 14 are provided. The one ends of the guide arms 14 are supported via hinges 14' to the mounting element 15, which is mounted to the support arm 3. The other ends of the guide arms 14 are connected via hinges 14" to the connecting element 16, which is formed by a connecting arm 16' in the shown embodiment. The ends of the connecting arm 16' are connected to the hinges 14" of the guide arms 14. Due to the articulated arrangement of the connecting arm 16' between the guide arms 14, the guide element 17 can be held together with the vertically rotating roll element 19 and the horizontally rotating roll element 21 in the same rotational position, when the guide arms 4 are swiveled upwardly. Therefore, the longitudinal axis of the connecting element 16 is arranged essentially vertically, independently of the pivot states of the guide arms 14.

Further, as can be seen from FIGS. 12 to 14, the connecting arm 16' comprises accommodating points 30, spaced in its longitudinal direction, for accommodating a vertical shaft element 31, by means of which the vertically rotating roll element 19 is supported. Furthermore, the connecting arm 16 comprises a bore 32 for accommodating a horizontal axle element 33 supporting the horizontally rotating roll element 21.

Further, as can be seen from FIGS. 12 to 14, the diameter of the horizontally rotating roll element 21 increases towards the free end. Accordingly, the roll element comprises an undercut, by means of which the guiding of the roll element 21 on the guide projection 22 of the guide track 18 can be improved.

Further, as can be seen from FIG. 14, the spring elements 23 for biasing the guide arms 14 toward the upwardly swivelled position are formed by torsion springs 23'. The torsion springs 23' are arranged on the hinges 14' of the guide arm on the side of the support arm 3.

The invention claimed is:

1. A device for opening an aircraft door provided on an aircraft fuselage, said device comprising: a support arm that is arranged in an articulated manner between the aircraft fuselage and the aircraft door; an opening system for opening the aircraft door by lifting the aircraft door from a closed position into an intermediate position and transferring the aircraft door from the intermediate position into an open position; a support arm cover substantially entirely covering the support arm in the closed position of the aircraft door, wherein the support arm cover has a cover element immovably arranged on the support arm, and a flap element which, when the aircraft door is opened, swivels between a state in which the flap element is substantially flush with the cover element, and a state in which the flap element overlaps the cover element; and a guide system for guiding the flap element when the aircraft door is opened, wherein the guide system has at least one guide arm, one end of which is joined in an articulated manner to the support arm, and the other end of which is joined to at least one guide element, wherein the guide element is guided along a guide track on an inner side of the flap element, when the aircraft door is opened.

2. The device according to claim 1, wherein the guide element comprises at least one roll element which rolls on the guide track on the inner side of the flap element.

3. The device according to claim 2, wherein the guide element comprises a roll element which is rotatable about an essentially vertical rotational axis and which rolls on an essentially vertical guide surface of the guide track.

4. The device according to claim 2, wherein the guide element comprises a roll element which is rotatable about an essentially horizontal rotational axis and which rolls on a corresponding guide projection of the guide track.

5. The device according to claim 4, wherein the diameter of the horizontally rotatable roll element increases towards a free end.

6. The device according to claim 4, wherein the guide projection for the horizontally rotating roll element comprises a height variation.

7. The device according to claim 4, wherein the corresponding guide projection of the guide track is essentially horizontal.

8. The device according to claim 1, wherein on the inner side of the flap element, a bearing element forming the guide track for the guide element is mounted.

9. The device according to claim 1, wherein the at least one guide arm is connected to a spring element, so that the at least one guide arm is transferred, with the help of the spring element, from a compressed state of the guide system in the closed position of the aircraft door to an at least partially extended state of the guide system in the open position of the aircraft door.

10. The device according to claim 9, wherein a torsion spring is provided as the spring element, which is arranged about a hinge of the guide arm on a side of the support arm.

11. The device according to claim 10, wherein the hinge is defined between the guide arm and the support arm on a mounting element, which is mounted on a front side of the support arm, which front side faces the flap element.

12. The device according to claim 11, wherein the guide system comprises a link element on the support arm, in which link element a guide member is guided on the inner side of the flap element, when the aircraft door is lifted.

13. The device according to claim 12, wherein the link element comprises a guide channel that extends transversely to the vertical line and is open on one side, so that the shifting of the guide member along the guide channel of the link element is converted into a swivelling of the flap element, when the aircraft door is lifted.

14. The device according to claim 12, wherein the guide member comprises a guide roll, which rolls on a wall of the link element.

15. The device according to claim 11, wherein on the support arm, at least two link elements for at least two guide members are provided on the inner side of the flap element, wherein a guide member is arranged each on an upper end portion and a lower end portion of the flap element.

16. The device according to claim 10, wherein the guide system comprises two guide arms which are arranged relative to one another in an essentially parallel manner, the one ends of which are joined in an articulated manner to the support arm, and the other ends of which are joined in an articulated manner to a connecting element between the guide arms.

17. The device according to claim 1, wherein the guide system comprises two guide arms which are arranged relative to one another in an essentially parallel manner, the one ends of which are joined in an articulated manner to the support arm, and the other ends of which are joined in an articulated manner to a connecting element between the guide arms.

18. The device according to claim 17, wherein the connecting element comprises an elongate connecting arm, the ends of which are joined in an articulated manner to the guide arms.

19. The device according to claim 17, wherein the connecting arm comprises accommodating points spaced in a longitudinal direction for accommodating a shaft element supporting the vertically rotating roll element.

20. The device according to claim 17, wherein the connecting arm comprises a bore for accommodating an axle element supporting the horizontally rotating roll element.

* * * * *